(12) United States Patent
Ali et al.

(10) Patent No.: US 8,794,918 B2
(45) Date of Patent: Aug. 5, 2014

(54) SYSTEM FOR ADJUSTING BRUSH SEAL SEGMENTS IN TURBOMACHINE

(75) Inventors: Sulficker Ali, Bangalore (IN); Saravana Bhava Timmareddy, Bangalore (IN); Seshu Kumar Mahankali, Bangalore (IN); Xiaoqing Zheng, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 708 days.

(21) Appl. No.: 12/987,052

(22) Filed: Jan. 7, 2011

(65) Prior Publication Data
US 2012/0177483 A1 Jul. 12, 2012

(51) Int. Cl.
*F04D 29/10* (2006.01)

(52) U.S. Cl.
USPC ......................................... 415/230

(58) Field of Classification Search
USPC ......................................... 415/230
See application file for complete search history.

(56) References Cited

U.S. PATENT DOCUMENTS

| | | | |
|---|---|---|---|
| 5,496,045 A | 3/1996 | Millener et al. | |
| 5,961,280 A | 10/1999 | Turnquist et al. | |
| 6,131,910 A * | 10/2000 | Bagepalli et al. | 277/355 |
| 6,161,836 A * | 12/2000 | Zhou | 277/355 |
| 6,173,962 B1 | 1/2001 | Morrison et al. | |
| 6,226,975 B1 | 5/2001 | Ingistov | |
| 6,308,959 B1 | 10/2001 | Sokolihs et al. | |
| 6,502,823 B1 * | 1/2003 | Turnquist et al. | 277/355 |
| 6,505,834 B1 | 1/2003 | Dinc et al. | |
| 6,547,522 B2 | 4/2003 | Turnquist et al. | |
| 6,550,777 B2 | 4/2003 | Turnquist et al. | |
| 6,622,490 B2 * | 9/2003 | Ingistov | 60/782 |
| 6,786,488 B2 | 9/2004 | Laurello et al. | |
| 6,840,518 B2 | 1/2005 | Boston | |
| 6,880,829 B1 | 4/2005 | Datta | |
| 7,032,903 B1 | 4/2006 | Dalton et al. | |
| 7,168,708 B2 | 1/2007 | Dalton et al. | |
| 7,182,345 B2 | 2/2007 | Justak | |
| 7,201,378 B2 | 4/2007 | Kono | |
| 7,255,352 B2 | 8/2007 | Adis et al. | |
| 7,384,235 B2 | 6/2008 | Adis | |
| 7,410,173 B2 | 8/2008 | Justak | |

(Continued)

FOREIGN PATENT DOCUMENTS

| | | |
|---|---|---|
| EP | 1066480 | 1/2001 |
| EP | 1130294 | 9/2001 |

(Continued)

*Primary Examiner* — Nathaniel Wiehe
*Assistant Examiner* — Brian O Peters
(74) *Attorney, Agent, or Firm* — Fletcher Yoder P.C.

(57) ABSTRACT

A system includes a brush seal segment. The brush seal segment includes a movable support including a head, an extension, and a seal surface, wherein the head is configured to mount in a chamber. The brush seal segment also includes a brush coupled to the movable support along the seal surface, wherein the seal surface consists essentially of the brush. The brush seal segment also includes a biasing element coupled to the movable support, wherein the biasing element is configured to bias the movable support from a first position to a second position to increase a brush clearance in a space between the brush and a rotor, and the movable support is configured to move from the second position to the first position to decrease the brush clearance in response to a fluid flow from the space to the chamber.

21 Claims, 7 Drawing Sheets

(56) References Cited

U.S. PATENT DOCUMENTS

| | | | |
|---|---|---|---|
| 7,445,424 B1 | 11/2008 | Ebert et al. | |
| 7,461,847 B2 | 12/2008 | Short et al. | |
| 7,549,835 B2 | 6/2009 | Billert | |
| 7,565,729 B2 | 7/2009 | Adis et al. | |
| 7,628,581 B2 | 12/2009 | De Simone et al. | |
| 7,653,993 B2 | 2/2010 | Couture et al. | |
| 7,717,671 B2 | 5/2010 | Addis | |
| 8,075,254 B2 * | 12/2011 | Morgan et al. | 415/170.1 |
| 8,317,464 B2 * | 11/2012 | Alamsetty et al. | 415/170.1 |
| 2002/0050684 A1 | 5/2002 | Kono | |
| 2005/0073106 A1 | 4/2005 | Thermos et al. | |
| 2005/0110218 A1 | 5/2005 | Morrison et al. | |
| 2005/0179207 A1 | 8/2005 | Datta | |
| 2005/0285345 A1 | 12/2005 | Webster | |
| 2006/0021218 A1 | 2/2006 | McMillan | |
| 2006/0214378 A1 | 9/2006 | Zheng | |
| 2007/0018409 A1 | 1/2007 | Justak | |
| 2007/0096397 A1 | 5/2007 | Justak | |
| 2007/0120327 A1 | 5/2007 | Justak | |
| 2007/0214628 A1 | 9/2007 | Adis et al. | |
| 2008/0095616 A1 | 4/2008 | Alvanos et al. | |
| 2008/0258403 A1 | 10/2008 | Beichl et al. | |
| 2008/0309019 A1 | 12/2008 | Wolfe et al. | |
| 2009/0050410 A1 | 2/2009 | Berberich | |
| 2009/0196742 A1 * | 8/2009 | Turnquist et al. | 415/174.2 |
| 2009/0322028 A1 | 12/2009 | Wright | |
| 2010/0034644 A1 | 2/2010 | Scricca | |
| 2010/0054924 A1 | 3/2010 | Uyama et al. | |
| 2010/0064499 A1 | 3/2010 | Couture et al. | |
| 2010/0068042 A1 | 3/2010 | Bruck et al. | |

FOREIGN PATENT DOCUMENTS

| | | |
|---|---|---|
| EP | 1169585 | 1/2002 |
| EP | 1235010 | 8/2002 |
| EP | 1269048 | 1/2003 |
| EP | 1312840 | 5/2003 |
| EP | 1331423 | 7/2003 |
| EP | 1353097 | 10/2003 |
| EP | 1388695 | 2/2004 |
| EP | 1391642 | 2/2004 |
| EP | 1508671 | 2/2005 |
| EP | 1510655 | 3/2005 |
| EP | 1715223 | 10/2006 |
| EP | 1783406 | 5/2007 |
| EP | 1918523 | 5/2008 |
| EP | 1947297 | 7/2008 |
| EP | 2052171 | 4/2009 |
| JP | 2005061587 | 3/2005 |
| JP | 2005337448 | 12/2005 |
| JP | 2007139045 | 6/2007 |
| JP | 2008064260 | 3/2008 |
| WO | WO 9942704 | 8/1999 |
| WO | WO 0045070 | 8/2000 |
| WO | WO 0155625 | 8/2001 |
| WO | WO 0175339 | 10/2001 |
| WO | WO 2005091994 | 10/2005 |
| WO | WO 2008020002 | 2/2008 |
| WO | WO 2008094761 | 8/2008 |
| WO | WO 2009010040 | 1/2009 |

* cited by examiner

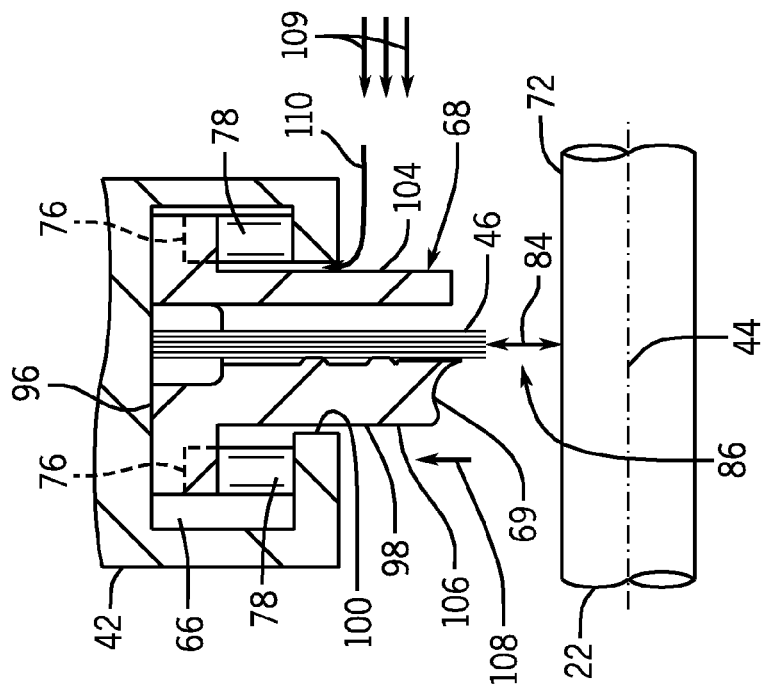
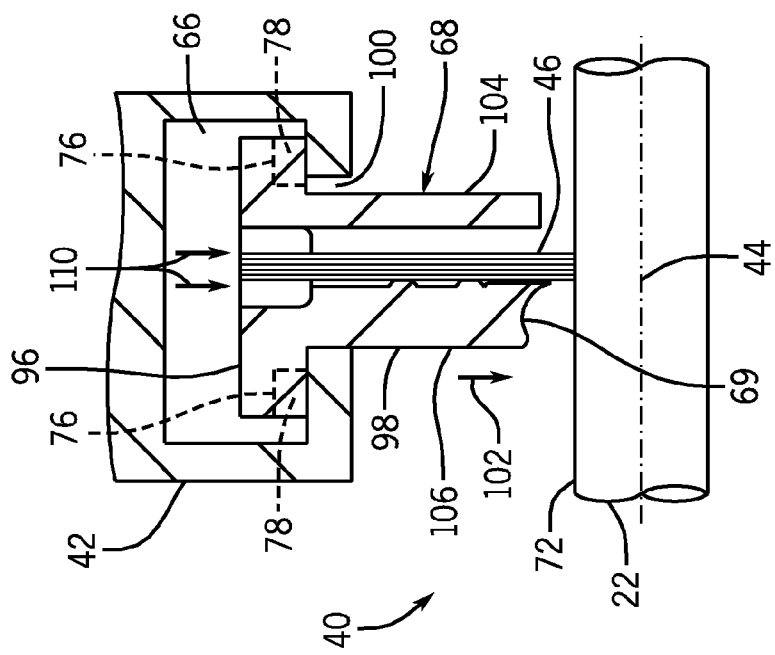

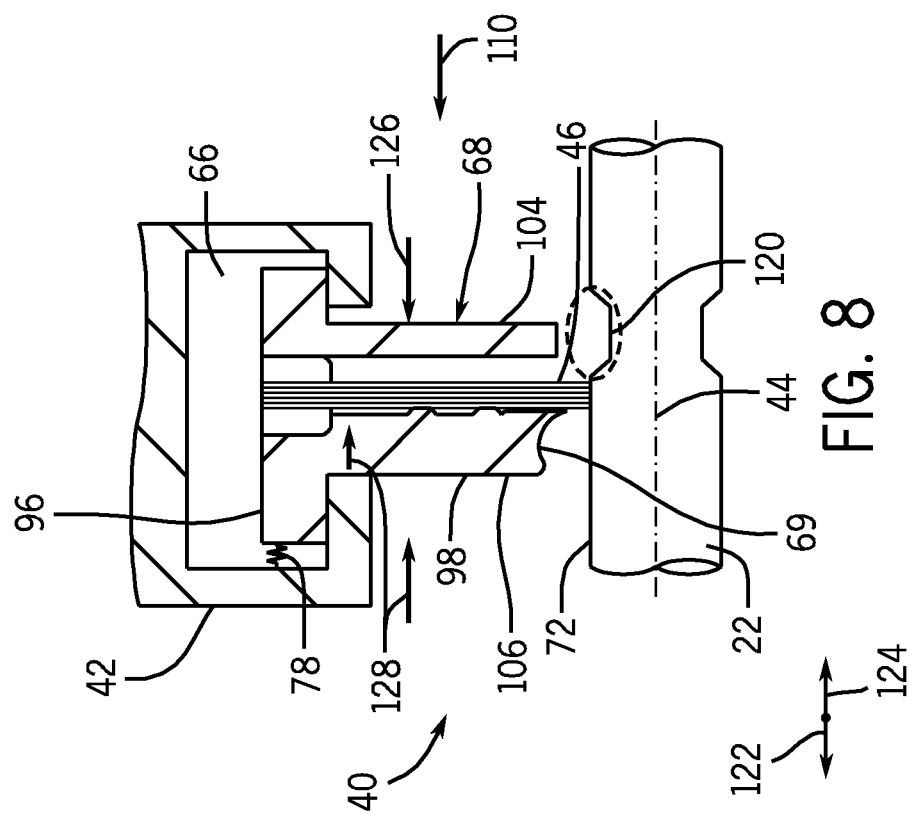
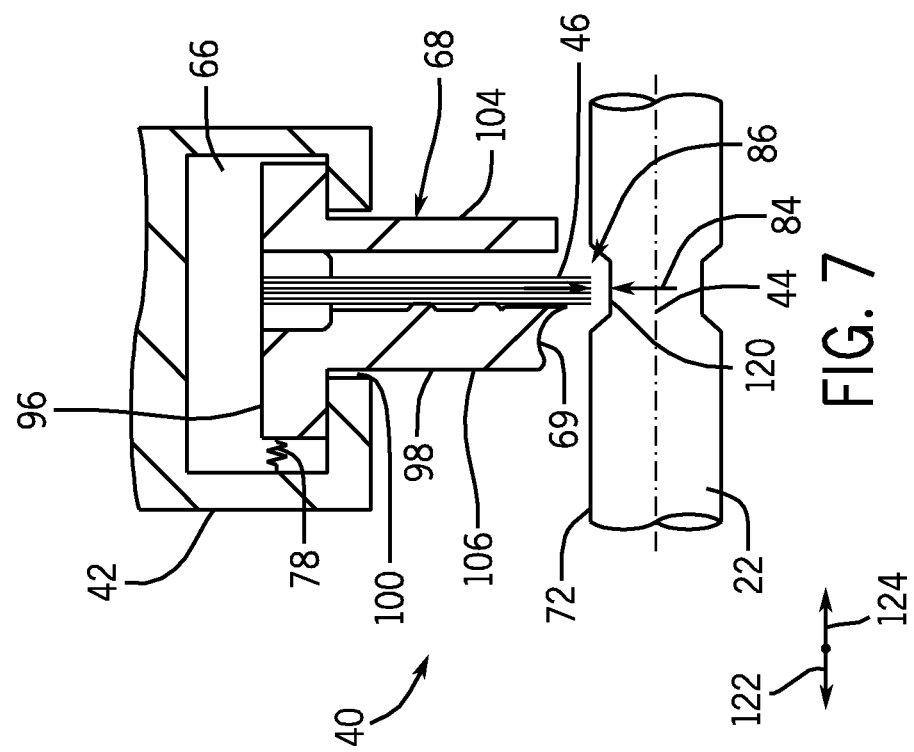

SYSTEM FOR ADJUSTING BRUSH SEAL SEGMENTS IN TURBOMACHINE

BACKGROUND OF THE INVENTION

The subject matter disclosed herein relates to turbomachines, and more particularly, turbines and compressors having brush seal segments disposed about a respective rotor.

A seal such as a brush seal, blocks fluid flow between adjacent components. In rotary machines, a seal may block fluid flow between a stationary component and a rotating component. In some rotary machines, such as turbomachines, the seal may experience steady state conditions and transient conditions, which are substantially different from one another. For example, the transient conditions may correspond to a start up or shut down of the rotary machine. During these transient conditions, the rotary machine may experience considerable temperature gradients, differential growth, vibration, and other dynamic behavior. As a result, the transient conditions increase the possibility of damage to the seal and/or the seal interface between the stationary and rotating components. In particular, the transient conditions may cause radial wear of the brush seals and may increase leakage flow. Thus, the risk of damage by brush seals limits their use in certain rotary machines, such as turbomachines.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In accordance with a first embodiment, a system includes a brush seal segment. The brush seal segment includes a movable support, a brush coupled to the movable support, and a biasing element coupled to the movable support. The biasing element is configured to bias the movable support in an axial direction to change the brush clearance in a space between a rotor and the stator.

In accordance with a second embodiment, a system includes a turbomachine including a rotor and stator, wherein the rotor includes a groove and the stator includes a chamber. The system also includes a brush seal segment. The brush seal segment includes a movable support coupled to the chamber, a brush coupled to the movable support, and a biasing element coupled to the movable support. The biasing element is configured to bias the movable support from a first position to a second position in the chamber to move the brush into the groove. The movable support is configured to move from the second position to the first position in the chamber to move the brush out of the groove.

In accordance with a third embodiment, a system includes a brush seal segment. The brush seal segment includes a movable support including a head, an extension, and a seal surface, wherein the head is configured to mount in a chamber. The brush seal segment also includes a brush coupled to the movable support along the seal surface, wherein the seal surface consists essentially of the brush. The brush seal segment also includes a biasing element coupled to the movable support, wherein the biasing element is configured to bias the movable support from a first position to a second position to increase a brush clearance in a space between the brush and a rotor, and the movable support is configured to move from the second position to the first position to decrease the brush clearance in response to a fluid flow from the space to the chamber.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 5 is a partial cross-sectional side view of an embodiment of the stator, brush seal segment, and rotor, taken along line 5-5 of FIGS. 2 and 4, illustrating a steady state position of the brush seal segment;

FIG. 6 is a partial cross-sectional side view of the stator, brush seal segment, and rotor of FIG. 5, illustrating a transient position of the brush seal segment;

FIG. 7 is a partial cross-sectional side view of an embodiment of the stator, brush seal segment, and rotor, taken along line 5-5 of FIGS. 2 and 4, illustrating a transient position of the brush seal segment;

FIG. 8 is a partial cross-sectional side view of the stator, brush seal segment, and rotor of FIG. 7, illustrating a steady state position of the brush seal segment;

DETAILED DESCRIPTION OF THE INVENTION

Figure 1:
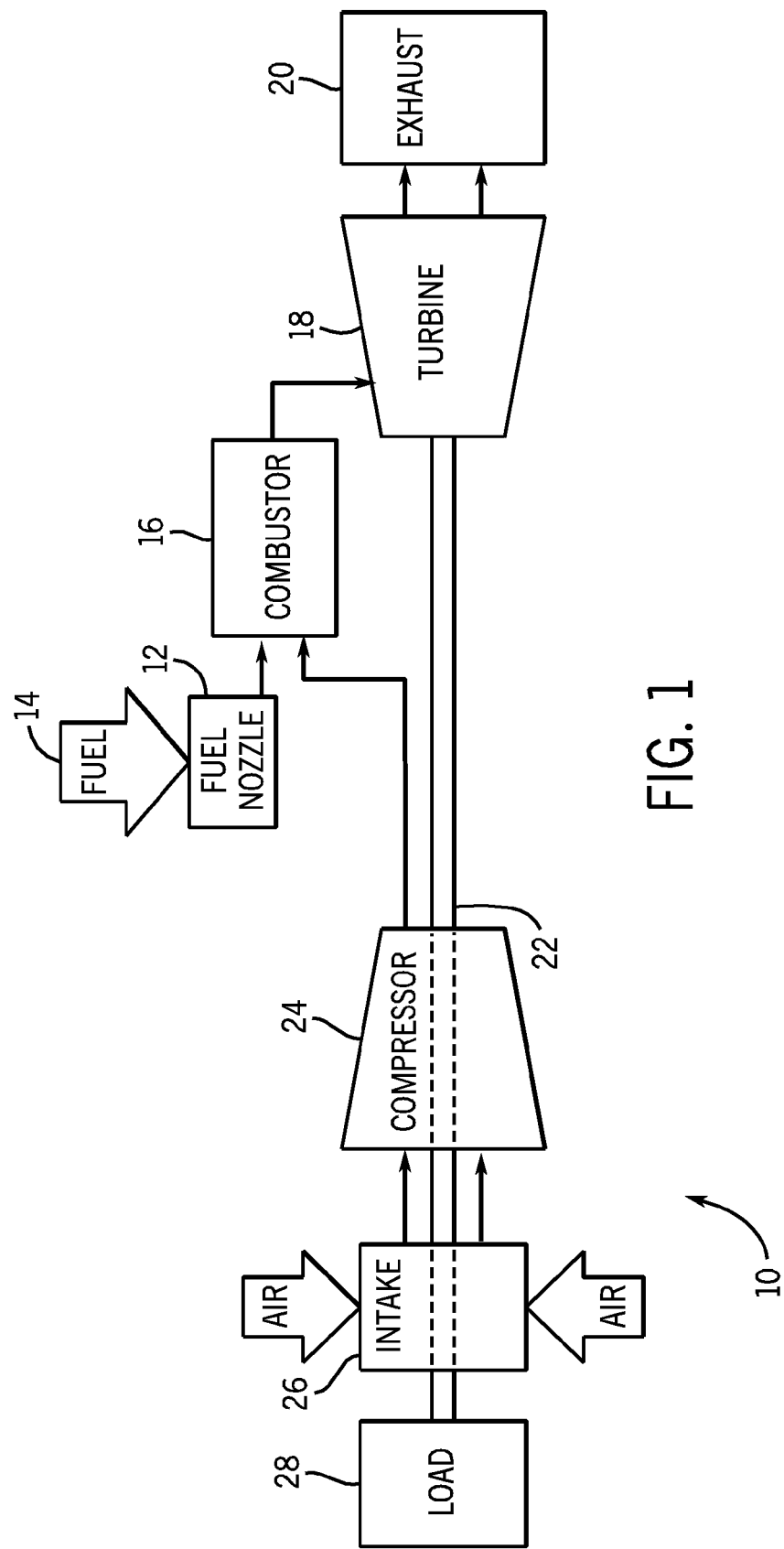
FIG. 1 is a block diagram of an embodiment of a turbine system having a brush seal segment with features to reduce brush wear and increase turbine efficiency.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments are directed to standalone, movable (e.g., retractable) brush seal segments in a turbomachine, such as a turbine (e.g., gas or steam turbine) or a compressor, designed to avoid brush contact with a rotor during transient operations or conditions (e.g., start-up, shut down, or other dynamic conditions) of the turbomachine, while forming a seal with the rotor during a steady state condition of the turbomachine. As discussed below, a biasing element (e.g., a spring) biases the brush seal segment in an axial and/or radial direction along an axial, radial, and/or angled path of movement to increase brush clearance in the space between the rotor and a stator during transient operation. During steady state conditions, an opposing force or activation mechanism overcomes the biasing element to move the brush seal segment in an opposite axial and/or radial direction, thereby decreasing the brush clearance to improve the sealing effectiveness of the brush seal segment. For example, the opposing force may be a leakage flow of a working fluid. By further example, after start-up of a turbine engine, a leakage flow of fluids (e.g., steam or combustion gases) may create a pressure differential to overcome the bias of the biasing element. As a result, the brush seal segment moves in the axial and/or radial direction along the axial, radial, and/or angled path of movement to decrease the brush clearance and improve the seal with the rotor. In certain embodiments, the rotor includes a groove to provide brush clearance during transient operations. For example, the brush seal segment (or a plurality of brush seal segments in an annular arrangement) may rest over the groove (e.g., annular groove) during transient conditions, and then move away from the groove to decrease brush clearance during steady state operations. In other embodiments, the brush seal segment includes a movable support that includes a head, an extension, and a seal surface. The head is mounted in a chamber of a stationary component (e.g., stator) and the seal surface consists essentially of the brush without other seals. For example, the brush seal segment is not coupled to a backing ring but is standalone or self-contained within the chamber. The standalone configuration of the brush seal segment reduces axial space requirements for the brush seal segment within the turbomachine. The movable support is also coupled to the biasing element and is responsive to leakage flow in determining the amount of brush clearance between the brush and the rotor. In further embodiments, multiple brush seal segments form an annular arrangement between the rotor and the stator to form the seal, wherein adjacent brush seal segments include intermediate biasing elements to reduce rub between the adjacent brush seal segments. The design of the brush seal segments reduces brush seal wear that occurs during transient conditions, reduces the axial space occupied by the brush seal segments, and allows more brush seals within the turbomachine to increase efficiency.

The disclosed embodiments of the brush seal segments may be utilized in any suitable turbomachine, such as turbines (e.g., gas or steam turbines) and compressors. However, for purposes of discussion, the disclosed embodiment within FIG. 1 is presented in context of a gas turbine system. FIG. 1 is a block diagram of an embodiment of a turbine system 10 having a brush seal segment with features to reduce brush wear and increase turbine efficiency. For example, the brush seal segments may be designed to avoid brush contact (e.g., increase clearance) with a rotor during transient conditions of the turbine system and to form a seal (e.g., reduce clearance) with a rotor during a steady state condition of the turbine system. Thus, the brush seal segments may be described as movable, adjustable, retractable, or automatically responsive to operating conditions of the turbine system 10.

The turbine system 10 may use liquid or gas fuel, such as natural gas and/or a hydrogen rich synthetic gas, to drive the turbine system 10. As depicted, one or more fuel nozzles 12 intake a fuel supply 14, mix the fuel with air, and distribute the air-fuel mixture into a combustor 16 in a suitable ratio for optimal combustion, emissions, fuel consumption, and power output. The turbine system 10 may include one or more fuel nozzles 12 located inside one or more combustors 16. The air-fuel mixture combusts in a chamber within the combustor 16, thereby creating hot pressurized exhaust gases. The combustor 16 directs the exhaust gases through a turbine 18 toward an exhaust outlet 20. As the exhaust gases pass through the turbine 18, the gases force turbine blades to rotate a shaft or rotor 22 along an axis of the turbine system 10. As described below, brush seal segments may be disposed in an annular arrangement between the rotor 22 and stationary components of the turbine 18 (e.g., stators) to form a seal during steady-state conditions and to provide brush clearance during transient conditions. The rotor 22 may include one or more grooves for brushes of the brush seal segments.

As illustrated, the rotor 22 may be connected to various components of the turbine system 10, including a compressor 24. The compressor 24 also includes blades coupled to the rotor 22. The compressor 24 may also include brush seal segments in annular arrangement between the rotor 22 and stationary components of the compressor 24, wherein the brush seal segments are responsive to operating conditions. As the rotor 22 rotates, the blades within the compressor 24 also rotate, thereby compressing air from an air intake 26 through the compressor 24 and into the fuel nozzles 12 and/or combustor 16. The rotor 22 may also be connected to a load 28, which may be a vehicle or a stationary load, such as an electrical generator in a power plant or a propeller on an aircraft, for example. The load 28 may include any suitable device capable of being powered by the rotational output of the turbine system 10.

Figure 2:
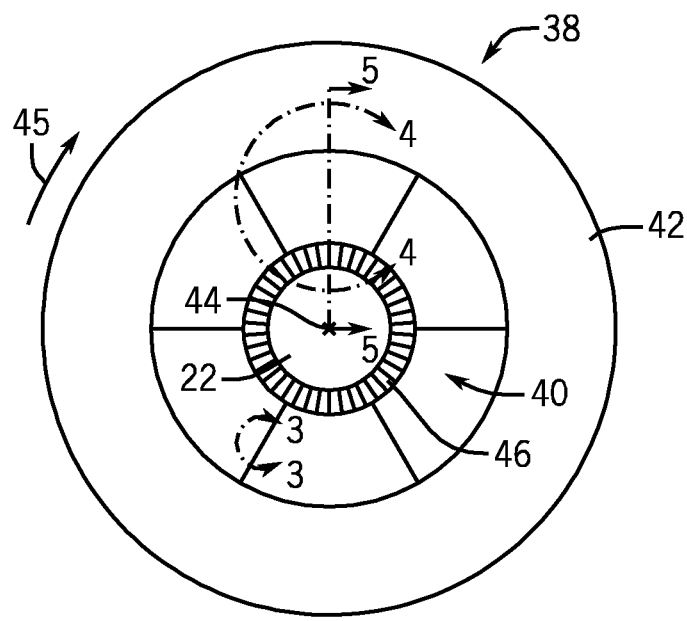
FIG. 2 is a partial cross-sectional view of an embodiment of a turbomachine having multiple brush seal segments.
Figure 3:
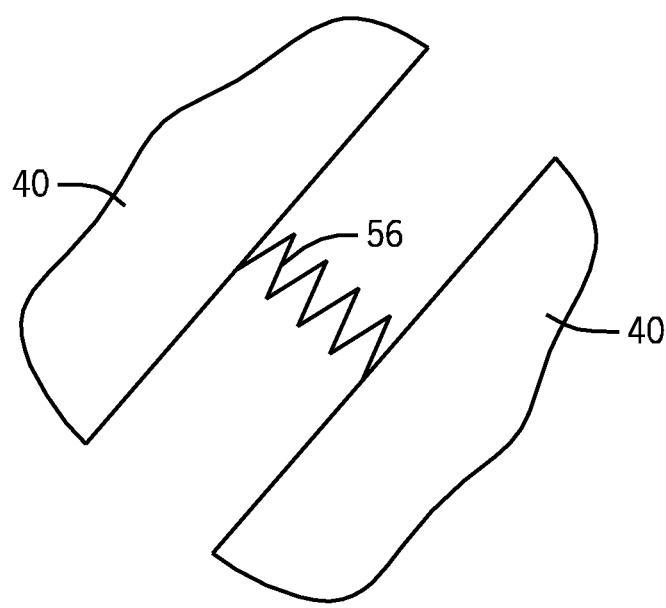
FIG. 3 is a partial cross-sectional view of an embodiment of an intermediate biasing element disposed between adjacent brush seal segments, taken within line 3-3 of FIG. 2.

FIG. 2 is a cross-sectional view of an embodiment of a portion of a turbomachine 38 (e.g., the turbine 18 or compressor 24 of FIG. 1) having multiple brush seal segments 40. The turbomachine 38 includes the rotor 22 disposed in a stationary stator 42. The turbomachine 38 also includes multiple brush seal segments 40. As illustrated, the brush seal segments 40 form an annular arrangement between the rotor 22 and stator 42 about a rotational axis 44 of the rotor 22. The number of brush seal segments 40 in the annular arrangement depends upon a diameter of the rotor 22 and other design considerations. In certain embodiments, the number of brush seal segments 40 may range from 2 to 12 or more. Brushes 46 extending from the brush seal segments 40 form a seal with the rotor 22 under steady-state conditions as the rotor 22 rotates in a circumferential direction 45. During transient conditions (e.g., start-up, shut down, or other dynamic conditions), brush clearance is greater between the brushes 46 and the rotor 22 to reduce wear on the brush seal segments 40, to reduce damage to the rotor 22, and to reduce heat generation. As illustrated, each brush seal segment 40 includes an arcuated shape. As illustrated in FIG. 3, an intermediate biasing element 56 (e.g., a spring) is disposed between adjacent brush seal segments 40 to provide a force to move the segment away from the rotor and to maintain some clearance and to reduce rubbing between the adjacent segments 40. The intermediate biasing element 56 also may facilitate proper alignment between the adjacent brush seal segments 40. For example, the intermediate biasing element 56 may reduce the possibility of one brush seal segment 40 moving against an adjacent brush seal segment 40 and jamming the segments 40. Thus, the intermediate biasing element 56 may ensure freedom of movement of the brush seal segments 40 between different positions corresponding to the transient and steady state conditions.

Figure 4:
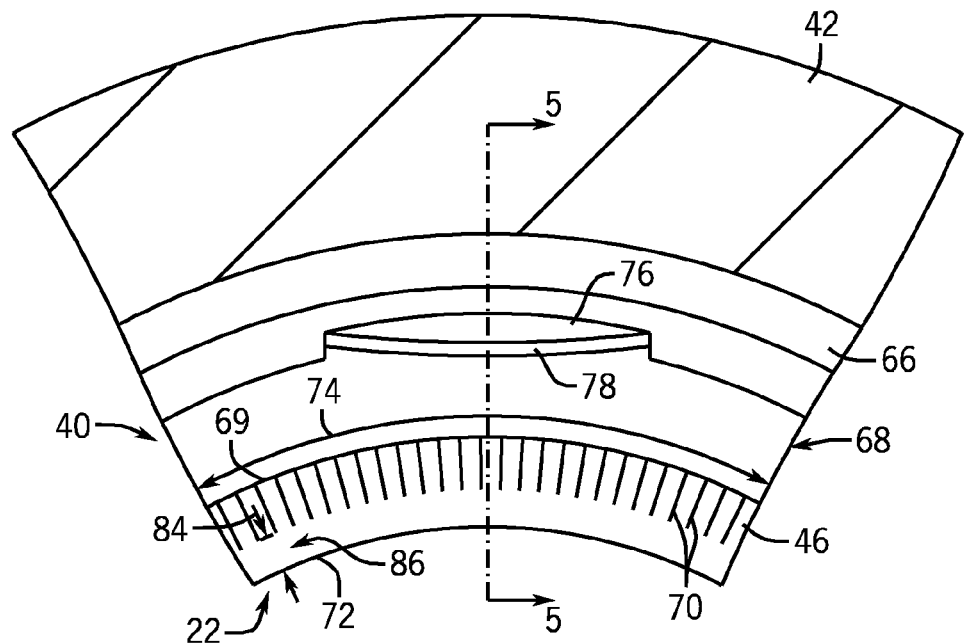
FIG. 4 is a partial cross-sectional view of an embodiment of a stator, brush seal segment, and rotor of the turbomachine of FIG. 2, taken with line 4-4 of FIG. 2.

FIG. 4 provides further details about the brush seal segments 40. FIG. 4 is a partial view of an embodiment of the stator 42, the brush seal segment 40, and the rotor 22 of the turbomachine 38 of FIG. 2, taken within line 4-4 of FIG. 2. The stator 42 includes a groove or chamber 66 (e.g. annular chamber). Each brush seal segment 40 is coupled to the chamber 66 as shown in greater detail below. The brush seal segment 40 includes a movable (e.g., retractable) support 68. The movable support 68 includes a seal surface 69. The brush 46 is coupled to the movable support 68 along the seal surface 69. In certain embodiments, the seal surface 69 consists essentially of the brush 46 without any other seals. The brush 46 includes numerous bristles 70 (e.g., metallic bristles) to form the seal with an outer surface 72 of the rotor 22. In certain embodiments, the bristles 70 of the brush 46 may be aligned in multiple rows (see FIGS. 5-10) along a length 74 of the movable support 68. In some embodiments, the individual bristles 70 may include a diameter of approximately 0.1 to 20 mils. In certain embodiments, the individual bristles 70 may include a length of approximately 20 to 200 mils. Materials for the bristles 70 may include metal, plastic, wood, ceramic, or other materials. Examples of metals include Haynes 25 alloy, Hastelloy® alloy, or other types of alloys. The movable support 68 includes one or more pockets 76 for one or more biasing elements 78 (e.g., springs) to bias the movable support 68 in an axial direction and/or radial direction relative to an axial and/or radial path of movement along the rotational axis 44 of the rotor 22. In certain embodiments, the movable support 68 includes an angled path of movement relative to the rotational axis 44 of the rotor 22. The biasing element 78 is coupled to the movable support 68 and may include a spring, such as a leaf spring. As illustrated, the biasing element 78 is an elongated arcuate spring element extending across a length of the pocket 76. In certain embodiments, the biasing element 78 may include a spring loaded bar, cam, hydraulic cylinder, pneumatic device, or any other biasing element.

As illustrated in FIGS. 5-12, the biasing element 78 is configured to bias the movable support 68 during transient conditions from a first position to a second position to increase a brush clearance 84 in a space 86 between the rotor 22 and the stator 42 (e.g., brush 46). The increased brush clearance during transient conditions reduces wear on the brush seal segment 40, reduces damage to the rotor 22, and reduces heat generation. As described in detail below, a fluid flow or a leakage flow (e.g., steam, combustion gases, etc.) is configured to bias the movable support 68 in an opposite direction from the biasing element 78. During steady-state conditions, in response to leakage flow from the space 86 to the chamber 66, the movable support 68 is configured to move from the second position to the first position to decrease brush clearance 84 in the space 86 between the rotor 22 and the stator 42 (i.e., brush 46) and form the seal.

FIGS. 5 and 6 are partial cross-sectional side views of embodiments of the stator 42, brush seal segment 40, and rotor 22, taken along line 5-5 of FIGS. 2 and 4. The stator 42 includes the groove or chamber 66 (e.g., annular chamber). The standalone or self-contained brush seal segment 40 is disposed within the chamber 66 without a backing ring. The brush seal segment 40 includes the movable support 68, brush 46, and a pair of biasing elements 78 disposed within pockets 76 of the movable support 68. The movable support 68 includes a head 96, an extension 98, and seal surface 69. As illustrated, the movable support 68 is coupled to the chamber 66. In particular, the head 96 of the movable support 68 is configured to mount in the chamber 66, such that the head 96 has a limited range of movement in the chamber 66. The head 96 is wider than an opening 100 of the stator 42 allowing the mounting of the head 96 into the chamber 66. The extension 98 of the movable support 68 extends from the head 96 through the opening 100 in radial direction 102. The brush 46 extends from the head 96, through the extension 98, and through the seal surface 69. The seal surface 69 consists essentially of the brush 46 without other seals.

As illustrated, the movable support 68 includes biasing elements 78 on a front side 104 (e.g., upstream side) and a back side 106 (e.g., a downstream side) of the support 68 within the pockets 76. Each biasing element 78 may include a spring (e.g., a leaf spring). Due to the biasing elements 78, the movable support 68 has a radial path of movement in radial directions 102 and 108 relative to the rotational axis 44 of the rotor 22 between first and second positions illustrated in FIGS. 5 and 6, respectively. As illustrated in FIG. 6, during transient conditions (e.g., start-up, shut down, or other dynamic conditions) the biasing elements 78 are configured to bias the movable support 68 from a first position (FIG. 5) to a second position in the chamber 66 in the radial direction 108, thereby increasing the brush clearance 84 in the space 86 between the brush 46 and the rotor 22. The movable support 68 is also configured to move from the second position (FIG. 6) to the first position (FIG. 5) to decrease the brush clearance 84 in response to leakage flow 110 from the space 86 to the chamber 66. For example, during operation (e.g., after start-up), a working fluid 109 (e.g., steam or combustion gases) approaches the brush seal segment 40 at the front side 104, and at least part of the working fluid 109 diverts as flow 110 into the chamber 66 of the stator 42. In certain embodiments, the working fluid 109 is a leakage flow in the turbine system 10, and the flow 110 is merely a diverted portion of the working fluid 109. In certain embodiments, the working fluid 109 may not be described as a leakage flow, yet flow 110 may still be described as a leakage flow by virtue of its diversion into the chamber 66. As illustrated in FIG. 5, the leakage flow 110 is configured to bias the movable support 68 in an opposite direction (i.e., radial direction 102) from the biasing elements 78 during steady state condition. As a result, the brush 46 of the brush seal segment 40 interfaces with the outer surface 72 of the rotor 22 to form the seal. Thus, the configuration of the brush seal segment 40 reduces brush seal wear that occurs during transient conditions, reduces the axial space occupied by the brush seal segments, and allows more brush seals within the turbomachine 38 to increase efficiency.

FIGS. 7 and 8 are partial cross-sectional side views of embodiments of the stator 42, brush seal segment 40, and rotor 22, taken along line 5-5 of FIGS. 2 and 4. In general, the stator 42, standalone brush seal segment 40, and rotor 22 are structurally as described in FIGS. 5 and 6 with certain variations in movability as discussed below. The rotor 22 includes a groove 120 (e.g., annular groove) disposed about the outer surface 72. The brush seal segment 40 includes the biasing element 78 (e.g., a spring) coupled to the back side 106 of the head 96 of the movable support 68. Due to the biasing element 78, the movable support 68 has an axial path of movement in axial directions 122 and 124 along the rotational axis 44 of the rotor 22 between first and second positions illustrated in FIGS. 8 and 7, respectively.

As illustrated in FIG. 7, the biasing element 78 is configured to bias the movable support 68 in the axial direction 124 to change the brush clearance 84 in the space 86 between the rotor 22 and the stator 42 (i.e., brush 46). In other words, the biasing element 78 is configured to bias the movable support 68 in the axial direction 124 to move the brush 46 into the groove 120 on the rotor 22. In particular, during transient conditions, the biasing element 78 is configured to bias the movable support 68 from a first position (FIG. 8) to a second position (FIG. 7) in the chamber 66 in the axial direction 124 to move the brush 46 into the groove 120, thereby increasing the brush clearance 84 in the space 86 between the brush 46 and the rotor 22. As illustrated in FIG. 8, the movable support 68 is also configured to move from the second position (FIG. 7) to the first position (FIG. 8) to decrease the brush clearance 84 in response to leakage flow 110, e.g., by moving the brush 46 out of the groove 120 to form the seal with the outer surface 72 of the rotor 22. For example, during operation (e.g., after start-up), a working fluid 109 or leakage flow 110 (e.g., steam or combustion gases) approaches the brush seal segment 40 at the front side 104 in the axial direction 122. As a result, the leakage flow 110 creates a pressure differential with a greater pressure 126 on the front side 104 and a lesser pressure 128 on the back side 106. Indeed, during steady state conditions, when the pressure 126 is greater than the force exerted by the biasing element 78 and the pressure 128, the leakage flow 110 is configured to bias the movable support 68 in an opposite direction (e.g., axial direction 122) from the biasing element 78. This axial movement 122 of the brush seal segment 40 moves the segment 40 out of the groove 120 in closer contact (e.g., less clearance 84) with the rotor 22. Due to the variable clearance 84 of the brush seal segment 40, the illustrated embodiment reduces brush seal wear and reduces the axial space occupied by the brush seal segments 40. In addition, the illustrated embodiment enables use of more brush seals within the turbomachine 38 to increase efficiency.

Figure 10:
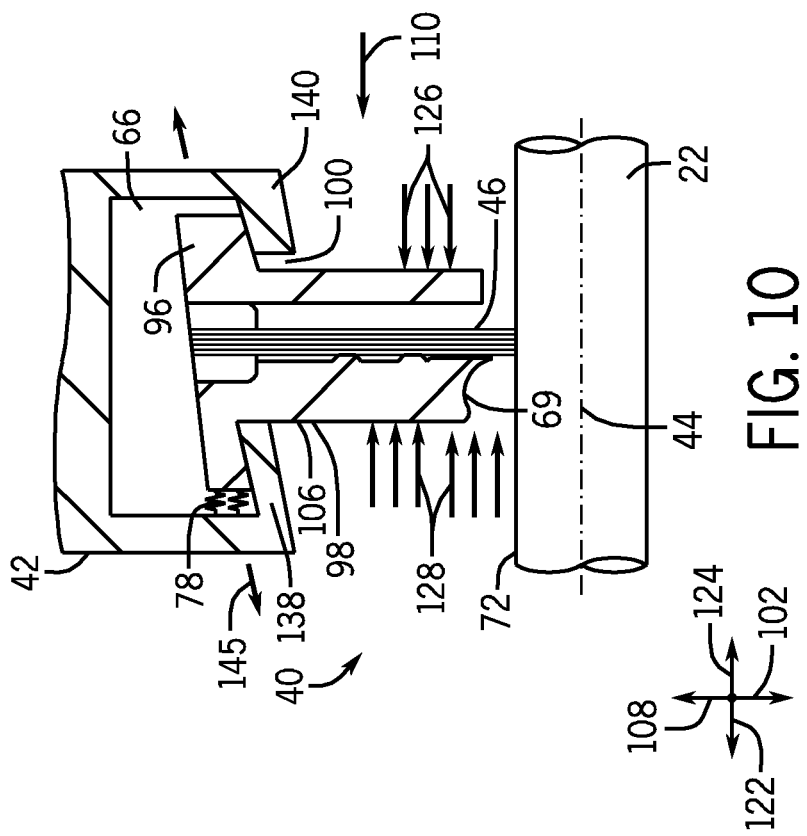
FIG. 10 is a partial cross-sectional side view of the stator, brush seal segment, and rotor of FIG. 9, illustrating a steady state position of the brush seal segment.
Figure 9:
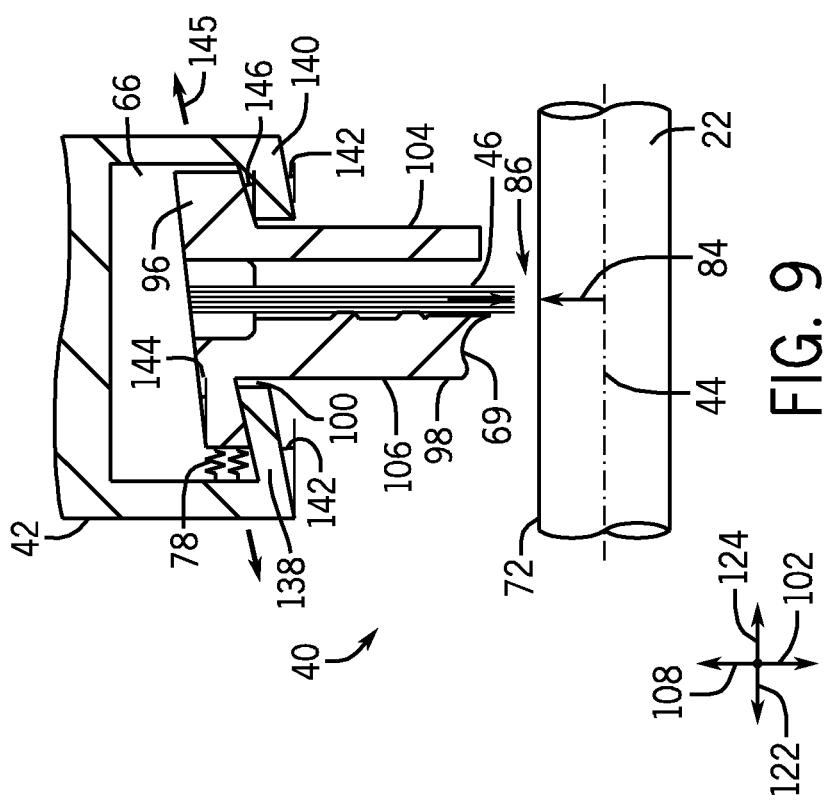
FIG. 9 is a partial cross-sectional side view of an embodiment of the stator, brush seal segment, and rotor, taken along line 5-5 of FIGS. 2 and 4, illustrating a transient position of the brush seal segment.

FIGS. 9 and 10 are partial cross-sectional side views of embodiments of the stator 42, brush seal segment 40, and rotor 22, taken along line 5-5 of FIGS. 2 and 4. In general, the stator 42, standalone brush seal segment 40, and rotor 22 are structurally as described in FIGS. 5 and 6 with certain variations in movability as discussed below. The brush seal segment 40 includes biasing elements 78 (e.g., springs) coupled to the back side 106 of the head 96 of the movable support 68. The number of biasing elements 78 may range from 1 to 10 or more. As illustrated, the stator 42 includes angled bottom portions 138 and 140 adjacent the opening 100 into the chamber 66, thereby defining an angled path of movement 145 of the head 96 in the chamber 66. The bottom portions 138 and 140 include angles 142 relative to the rotational axis 44 of the rotor 22 ranging between approximately 0 to 90 degrees, 1 to 89 degrees, 5 to 60 degrees, 5 to 45 degrees, 5 to 30 degrees, or 10 to 20 degrees. The head 96 of the movable support 68 is also angled 144 to correspond with the bottom portions 138 and 140 of the stator 42. For example, the angle 144 of the head 96 relative to the rotational axis 44 of the rotor 22 ranges between approximately 0 to 90 degrees, 1 to 89 degrees, 5 to 60 degrees, 5 to 45 degrees, 5 to 30 degrees, or 10 to 20 degrees. Due to the biasing element 78 and the angled configuration of the bottom portions 138 and 140 of the stator 42, the movable support 68 has an angled path of movement 145 relative to the rotational axis 44 of the rotor 22 generally in axial directions 122 and 124 and radial directions 102 and 106 between first and second positions illustrated in FIGS. 10 and 9, respectively. The angled path of movement has an angle 146 ranging between approximately 0 to 90 degrees, 1 to 89 degrees, 5 to 60 degrees, 5 to 45 degrees, 5 to 30 degrees, or 10 to 20 degrees. As illustrated, the biasing elements 78 are configured to bias the movable support 68 to move only along the angled path of movement. In other embodiments (e.g., FIGS. 11 and 12), one or more biasing elements 78 may be configured to bias the movable support along other paths of movement (e.g., axial) in addition to the angled path of movement.

As illustrated in FIG. 9, the biasing element 78 is configured to bias the movable support 68 along the angled path of movement 145 in the axial direction 124 and the radial direction 108 to change the brush clearance 84 in the space 86 between the rotor 22 and the stator 42 (e.g., brush 46). In particular, during transient conditions, the biasing element 78 is configured to bias the movable support 68 from a first position (FIG. 10) to a second position (FIG. 9) in the chamber 66 in the axial direction 124 and the radial direction 108 to increase the brush clearance 84 in the space 86 between the brush 46 and the rotor 22. As illustrated in FIG. 10, the movable support 68 is also configured to move from the second position (FIG. 9) to the first position (FIG. 10) to decrease the brush clearance 84 in response to leakage flow 110 to form the seal with the outer surface 72 of the rotor 22. For example, during operation (e.g., after start-up), fluid (e.g., steam or combustion gases) as part of the leakage flow 110 flows in the axial direction 122 imparting a greater pressure 126 on the front side 104 of the movable support 68 than pressure 128 on the back side 106 of the support 68. Indeed, during steady state conditions, when the pressure 126 is greater than the force exerted by the biasing element 78 and the pressure 128, the leakage flow 110 is configured to bias the movable support 68 in opposite directions (e.g., axial direction 122 and radial direction 102) from the biasing element 78. Due to the variable clearance 84 of the brush seal segment 40, the illustrated embodiment reduces brush seal wear and reduces the axial space occupied by the brush seal segments. In addition, the illustrated embodiment enables use of more brush seals within the turbomachine 38 to increase efficiency.

Figure 12:
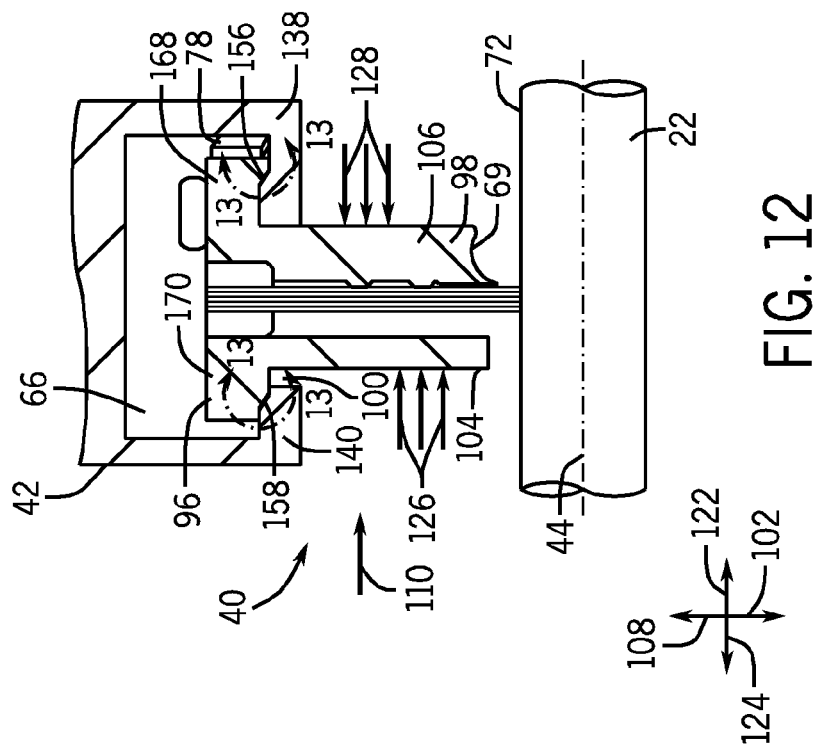
FIG. 12 is a partial cross-sectional side view of an embodiment of the stator, brush seal segment, and rotor of FIG. 11, illustrating a steady state position of the brush seal segment.
Figure 11:
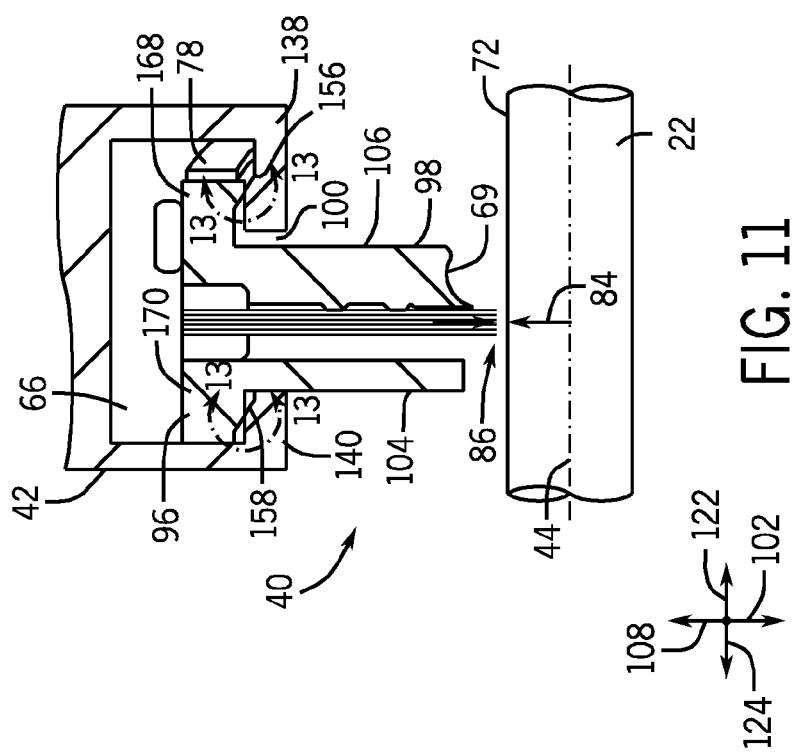
FIG. 11 is a partial cross-sectional side view of an embodiment of the stator, brush seal segment, and rotor, taken along line 5-5 of FIGS. 2 and 4, illustrating a transient position of the brush seal segment.

FIGS. 11 and 12 are partial cross-sectional side views of embodiments of the stator 42, brush seal segment 40, and rotor 22, taken along line 5-5 of FIGS. 2 and 4. In general, the stator 42, standalone brush seal segment 40, and rotor 22 are structurally as described in FIGS. 5 and 6 with certain variations in movability as described below. The brush seal segment 40 includes biasing element 78 (e.g., a spring) coupled to the back side 106 of the head 96 of the movable support 68. In certain embodiments, the biasing element 78 may include a wave spring (i.e., a coiled flat wire with waves added to the wire to give a spring effect). As illustrated, the bottom portions 138 and 140 of stator 42 include uppers surfaces 156 and 158 facing the chamber 66, wherein the upper surfaces 156 and 158 include grooves or recesses. The head 96 of the movable support 68 include protrusions configured to interact with the grooved upper surfaces 156 and 158 in response to leakage flow 110, as described below with reference to FIG. 13. Due to the biasing element 78 and configuration of the grooved upper surfaces 156 and 158 of bottom portions 138 and 140 of the stator 42, the movable support 68 has an axial path of movement along the rotational axis 44 of the rotor 22.

In addition, the movable support 68 has an angled path of movement relative to the rotational axis 44 of the rotor 22 generally in axial directions 122 and 124 and radial directions 102 and 108 between first and second positions illustrated in FIGS. 12 and 11, respectively. The angled path of movement has an angle ranging between approximately 0 to 90 degrees, 1 to 89 degrees, 5 to 60 degrees, 5 to 45 degrees, 5 to 30 degrees, or 10 to 20 degrees. As illustrated, the biasing element 78 is configured to bias the movable support 68 to move along the axial path of movement followed by the angled path of movement from the first position (FIG. 12) to the second position (FIG. 11).

As illustrated in FIG. 11, the biasing element 78 is configured to bias the movable support 68 in the axial direction 124 and the radial direction 108 to change the brush clearance 84 in the space 86 between the rotor 22 and the stator 42 (e.g., brush 46). In particular, during transient conditions, the biasing element 78 is configured to bias the movable support 68 from a first position (FIG. 12) to a second position (FIG. 11) in the chamber 66 in the axial direction 124 and the radial direction 108 to increase the brush clearance 84 in the space 86 between the brush 46 and the rotor 22. As illustrated in FIG. 12, the movable support 68 is also configured to move from the second position (FIG. 11) to the first position (FIG. 12) to decrease the brush clearance 84 in response to leakage flow 110 to form the seal with the outer surface 72 of the rotor 22. For example, during operation (e.g., after start-up), fluid (e.g., steam or combustion gases) as part of the leakage flow 110 flows in the axial direction 122 imparting a greater pressure 126 on the front side 104 of the movable support 68 than pressure 128 on the back side 106 of the support 68. Indeed, during steady state conditions, when the pressure 126 is greater than the force exerted by the biasing element 78 and the pressure 128, the leakage flow 110 is configured to bias the movable support 68 in opposite directions (e.g., axial direction 122 and radial direction 102) from the biasing element 78.

Figure 13:
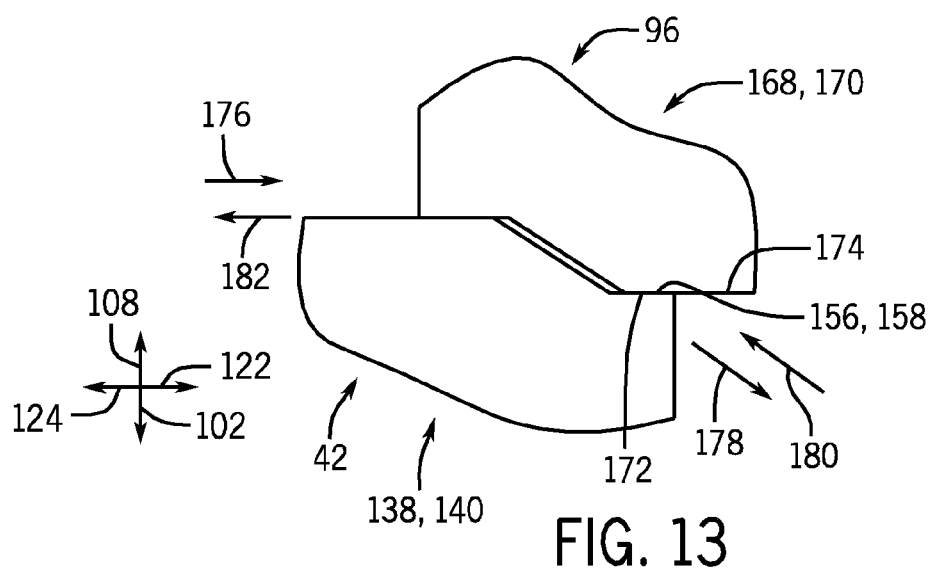
FIG. 13 is a partial cross-sectional side view of an embodiment of an interface between a head of a movable support of the brush seal segment and the stator of FIGS. 11 and 12, taken within lines 13-13 of FIGS. 11 and 12.

FIG. 13 illustrates the interaction between the head 96 of the movable support 68 and the stator 42. FIG. 13 is a partial cross-sectional side view of an embodiment of an interface between the head 96 of the movable support 68 of the brush seal segment 40 and the stator 42 of FIGS. 11 and 12, taken within lines 13-13 of FIGS. 11 and 12. Details of FIG. 13 apply to both bottom portions 138 and 140 of stator 42 and corresponding ends 168 and 170 of the head 96 of the movable support 68. The bottom portions 138 and 140 of the stator 42 include the upper surfaces 156 and 158, each of which includes a groove 172 configured to interact with a protrusion 174 of the ends 168 and 170. Alternatively, in certain embodiments, the ends 168 and 170 may include the groove 172, while the bottom portions 138 and 140 include the protrusion 140. In addition, in other embodiments, the configuration of the ends 168 and 170 and the bottom portions 138 and 140 may vary to include various curved and/or angled shapes to facilitate an angled range of movement.

In response to leakage flow 110 (e.g., after start-up), as described above in FIGS. 11 and 12, the ends 168 and 170 of the head 96 move first along the axial path of movement 176 in the axial direction 122, and then move along an angled path of movement 178 generally in the axial direction 122 and the radial direction 102 until the protrusions 170 are disposed within the grooves 172. In response to transient conditions, the head 96 moves in the reverse direction. In other words, the ends 168 and 170 of the head 96 move first along the angled path of movement 180 generally in the axial direction 124 and the radial direction 108, and then move along an axial path of movement 182 in the axial direction 124. Due to the variable clearance 84 of the brush seal segment 40, the illustrated embodiment reduces brush seal wear and reduces the axial space occupied by the brush seal segments. In addition, the illustrated embodiment enables use of more brush seals within the turbomachine 38 to increase efficiency.

Technical effects of the described embodiments include providing systems with movable (e.g., retractable) brush seal segments 40 in turbomachines 38, such as a turbine 18 (e.g., gas or steam turbine) or a compressor 24, to avoid brush contact with the rotor 22 during transient operations or conditions (i.e., start-up, shut down, or other dynamic conditions) of the turbomachine 38, while forming a seal with the rotor 22 during a steady state condition of the turbomachine 38. The movability or retractibility (e.g., in axial and/or radial directions) of the brush seal segments 40 may reduce brush seal wear that occurs during transient conditions. In addition, the brush seal segments 40 are standalone or self-contained (e.g., lacking a backing ring) and, thus may reduce the axial space occupied by the brush seal segments 40. Overall, the design of the brush seal segments 40 may allow the use of more brush seals within turbomachines 38 to increase efficiency.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention is:

1. A system, comprising:
    a brush seal segment, comprising:
        a movable support;
        a brush coupled to the movable support; and
        a biasing element coupled to the movable support, wherein the biasing element is configured to bias the entire movable support in a same axial direction to change a brush clearance in a space between a rotor and a stator, wherein the stator comprises a chamber having angled bottom portions, wherein a portion of the movable support is disposed within the chamber, and the biasing element in conjunction with the angled bottom portions is configured to bias the movable support in the same axial direction and a radial direction to change the brush clearance in the space between the rotor and the stator.

2. The system of claim 1, wherein the movable support has an angled path of movement relative to a rotational axis of the rotor, and the angled path of movement has an angle greater than approximately 0 and less than approximately 90 degrees.

3. The system of claim 2, wherein the biasing element is configured to bias the movable support to move only along the angled path of movement.

4. The system of claim 2, wherein the movable support has an axial path of movement along the rotational axis of the rotor.

5. The system of claim 4, wherein the biasing element is configured to bias the movable support to move along the axial path of movement followed by the angled path of movement.

6. The system of claim 1, wherein the biasing element is configured to bias the movable support in the same axial direction to move the brush into a groove on the rotor.

7. The system of claim 1, wherein the biasing element is configured to bias the movable support from a first position to a second position to increase the brush clearance in the space between the brush and the rotor, the movable support is configured to move from the second position to the first position to decrease the brush clearance in response to a fluid flow, and the fluid flow is configured to bias the movable support in an opposite direction from the biasing element.

8. The system of claim 1, wherein the biasing element comprises a spring.

9. The system of claim 1, the system comprising a turbomachine having the rotor, the stator, and the brush seal segment.

10. The system of claim 9, comprising a plurality of brush seal segments in an annular arrangement between the rotor and the stator, wherein adjacent segments of the plurality of brush seal segments comprise an intermediate biasing element.

11. The system of claim 1, wherein the stator comprises a chamber, and the biasing element is disposed within the chamber.

12. A system, comprising:
a turbomachine comprising a rotor and a stator, wherein the rotor comprises a groove, and the stator comprises a chamber; and
a brush seal segment, comprising:
a movable support coupled to the chamber, wherein the movable support has an axial path of movement along a rotational axis of the rotor between a first position and a second position;
a brush coupled to the movable support; and
a biasing element disposed within the chamber and coupled to the movable support, wherein the biasing element is configured to bias the movable support along the axial path of movement from the first position to the second position in the chamber to move the brush into the groove, and the movable support is configured to move along the axial path of movement from the second position to the first position in the chamber to move the brush out of the groove.

13. The system of claim 12, wherein the biasing element is configured to bias the movable support from the first position to the second position in the chamber to move the brush into the groove during a transient condition of the turbomachine, and the movable support is configured to move from the second position to the first position in the chamber to move the brush out of the groove during a steady state condition of the turbomachine.

14. The system of claim 12, wherein the biasing element is configured to bias the movable support from the first position to the second position in the chamber to move the brush into the groove to increase a brush clearance between the brush and the rotor, and the movable support is configured to move from the second position to the first position in the chamber to move the brush out of the groove to decrease the brush clearance between the brush and the rotor.

15. The system of claim 12, wherein the turbomachine comprises a turbine.

16. The system of claim 12, wherein the biasing element is configured to bias the entire movable support from the first position to the second position in a same direction in the chamber to move the brush into the groove, and the entire movable support is configured to move from the second position to the first position in the chamber to move the brush out of the groove.

17. The system of claim 12, wherein the chamber comprises angled bottom portions, wherein a portion of the movable support is disposed within the chamber, and the biasing element in conjunction with the angled bottom portions is configured to bias the movable support in both an axial direction and a radial direction to change a brush clearance in the space between the rotor and the brush.

18. A system, comprising: a brush seal segment, comprising:
a movable support comprising:
a head, an extension, and a seal surface, wherein the head is configured to mount in a chamber;
a brush coupled to the movable support along the seal surface, wherein the seal surface consists essentially of the brush;
a biasing element coupled to the movable support, wherein the biasing element is configured to bias the entire movable support from a first position to a second position in a same axial direction to increase a brush clearance in a space between the brush and a rotor, and the entire movable support is configured to move from the second position to the first position to decrease the brush clearance in response to a fluid flow from the space to the chamber;
wherein the movable support has an axial path of movement along a rotational axis of the rotor between the first and second positions; and
wherein the movable support has a radial path of movement relative to the rotational axis of the rotor between the first and second positions.

19. The system of claim 18, wherein the movable support has an angled path of movement relative to a rotational axis of the rotor between the first and second positions, and the angled path of movement has an angle of approximately 5 to 60 degrees.

20. The system of claim 18, wherein the biasing element is configured to be disposed within the chamber.

21. The system of claim 18, wherein the chamber comprises angled bottom portions, and the biasing element in conjunction with the angled bottom portions is configured to bias the movable support in both the axial direction and a radial direction to change the brush clearance in the space between the rotor and the brush.

* * * * *